United States Patent [19]
Thompson, Jr. et al.

[11] Patent Number: 5,978,483
[45] Date of Patent: Nov. 2, 1999

[54] SECURELY ENCRYPTED REMOTE KEYLESS ENTRY SYSTEM

[75] Inventors: Darwin Thompson, Jr., Mission Viejo; Eric W. Abbiss, Redondo Beach, both of Calif.

[73] Assignee: Inkel Corporation, La Mirada, Calif.

[21] Appl. No.: 08/878,163

[22] Filed: Jun. 18, 1997

Related U.S. Application Data

[60] Provisional application No. 60/042,789, Apr. 7, 1997.

[51] Int. Cl.$^6$ .................... H04L 9/32; H04L 9/00
[52] U.S. Cl. .................... 380/23; 380/9; 380/21; 380/25; 380/43; 380/46; 380/49; 340/825.31; 340/825.34
[58] Field of Search .................. 331/78; 340/825.31, 340/825.34; 364/717.01–717.07; 380/4, 9, 21, 23, 24, 25, 30, 43, 46, 49, 50, 54

[56] References Cited

U.S. PATENT DOCUMENTS

| | | | |
|---|---|---|---|
| 4,509,093 | 4/1985 | Stellberger | 340/825.31 X |
| 4,758,835 | 7/1988 | Rathmann et al. | 340/825.31 |
| 4,786,900 | 11/1988 | Karasawa et al. | 340/825.31 |
| 5,144,667 | 9/1992 | Pogue, Jr. et al. | 380/25 X |
| 5,146,215 | 9/1992 | Drori | 340/825.31 X |
| 5,363,448 | 11/1994 | Koopman, Jr. et al. | 380/23 |
| 5,365,225 | 11/1994 | Bachhuber | 340/825.31 |
| 5,377,270 | 12/1994 | Koopman, Jr. et al. | 380/25 |
| 5,508,692 | 4/1996 | Wolfram | 340/825.31 |
| 5,619,573 | 4/1997 | Brinkmeyer et al. | 380/23 |

*Primary Examiner*—Bernarr E. Gregory
*Attorney, Agent, or Firm*—Freilich, Hornbaker & Rosen

[57] ABSTRACT

A remote keyless entry system particularly suited for preventing access to unauthorized individuals by securely encrypting messages transmitted from a remote transmitter to a receiver. A unique encryption algorithm is used to generate a multibit message having a pseudorandom number, key code and transmitter identification code (ID) encrypted within. The encryption algorithm generates said multibit message as a function of a pseudorandom number generator, a fixed key code table, ID and a switch, e.g., command, code. A receiver can decrypt the message to obtain the switch code and will respond thereto only if the message originated from an authorized transmitter, i.e., if the received pseudorandom number, key code and ID match those stored within the receiver.

17 Claims, 7 Drawing Sheets

B1=B2+B5+1

B5=B1+B3+1

SECURELY ENCRYPTED REMOTE KEYLESS ENTRY SYSTEM

This application claims the benefit of U.S. Provisional Application No. 60/042,789 filed Apr. 7, 1997.

FIELD OF INVENTION

This invention relates to a remote keyless entry system particularly suited for preventing entry by unauthorized individuals into a vehicle, e.g., an automobile.

BACKGROUND OF THE INVENTION

The prior art is replete with various remote keyless entry systems typically used for remotely actuating door locks in vehicles or opening garage doors. Typically, these systems are comprised of a remote transmitter that uses an RF or IR signal to transmit a multibit message comprised of a command code and an identification code (ID), e.g., an authorization code, and a receiver that responds to this command code when its ID matches the transmitted ID. Such systems are susceptible to pirating apparatus, i.e., scanners, that rapidly scan through all available IDs until a receiver grants them access. In response, entry systems have been designed to penalize wrong transmissions by not accepting additional transmissions for a time period. Other pirating apparatus, i.e., grabbers, capture, i.e., receive and store, the transmitted signal and then later retransmit this captured signal to obtain unauthorized access to a vehicle or garage. In response, entry systems have been designed in which an algorithm in the transmitter causes its authorization code to change, i.e., hop, each transmission. The receiver then uses an identical algorithm to authenticate each received authorization code.

SUMMARY OF THE INVENTION

The present invention is directed to a remote keyless entry system particularly suited for preventing access to unauthorized individuals by securely encrypting messages transmitted from a remote transmitter to a receiver. A unique encryption algorithm is used to generate a multibit message having a pseudorandom number, key code and transmitter identification code (ID) encrypted within. The encryption algorithm generates said multibit message as a function of a pseudorandom number generator, a fixed key code table, ID and a switch, e.g., command, code. A receiver can decrypt the message to obtain the switch code and will respond thereto only if the message originated from an authorized transmitter, i.e., if the received pseudorandom number, key code and ID match those stored within the receiver.

In accordance with a preferred embodiment, a preferred system for securely transmitting an I bit switch code from a transmit site to a receive site, comprises (1) a transmit pseudorandom number generator at said transmit site for periodically generating a J bit transmit pseudorandom number, (2) a transmit key value table at said transmit site for containing a fixed number of K bit transmit key values, (3) a message encrypter at said transmit site for encrypting a message by performing a bitwise operation between said J bit transmit pseudorandom number, said K bit transmit key code value selected from said transmit key code table, an L bit transmit ID and said switch code, (4) an RF modulator at said transmit site for transmitting said message from said transmit site to said receive site, (5) an RF demodulator at said receive site for receiving said transmitted message, (6) a receive pseudorandom number generator at said receive site for iteratively generating a receive pseudorandom number, (7) a receive key code table at said receive site for containing a fixed number of K bit receive key code values, (8) a code capture/decrypter at said receive site for capturing, decrypting and authenticating said message according to said J bit receive pseudorandom number, said K bit receive key code value selected from said receive key code table according to said message and an L bit receive ID, and wherein said code capture/decrypter recovers said switch code from said message when said message is authenticated.

In accordance with a further feature, a preferred receiver additionally comprises means for iteratively comparing within a predetermined range receive pseudorandom numbers to recovered transmit pseudorandom numbers in order to resynchronize the pseudorandom number generator in the receiver to the pseudorandom number generator in the transmitter.

Other features and advantages of the present invention should become apparent from the following description of the presently-preferred embodiments, taken in conjunction with the accompanying drawings, which illustrate, by way of example, the principles of the present invention.

DESCRIPTION OF THE PREFERRED EMBODIMENT

The present invention is directed to a remote keyless entry system particularly suited for preventing access to unauthorized individuals by securely encrypting messages transmitted from a remote transmitter to a receiver. A unique encryption algorithm is used to generate a multibit message having a pseudorandom number, key code and transmitter identification code (ID) encrypted within. The encryption algorithm generates said multibit message as a function of a pseudorandom number generator, a fixed key code table, ID and a switch, e.g., command, code. A receiver can decrypt the message to obtain the switch code and will respond thereto only if the message originated from an authorized transmitter, i.e., if the received pseudorandom number, key code and ID match those stored within the receiver.

Figure 1:
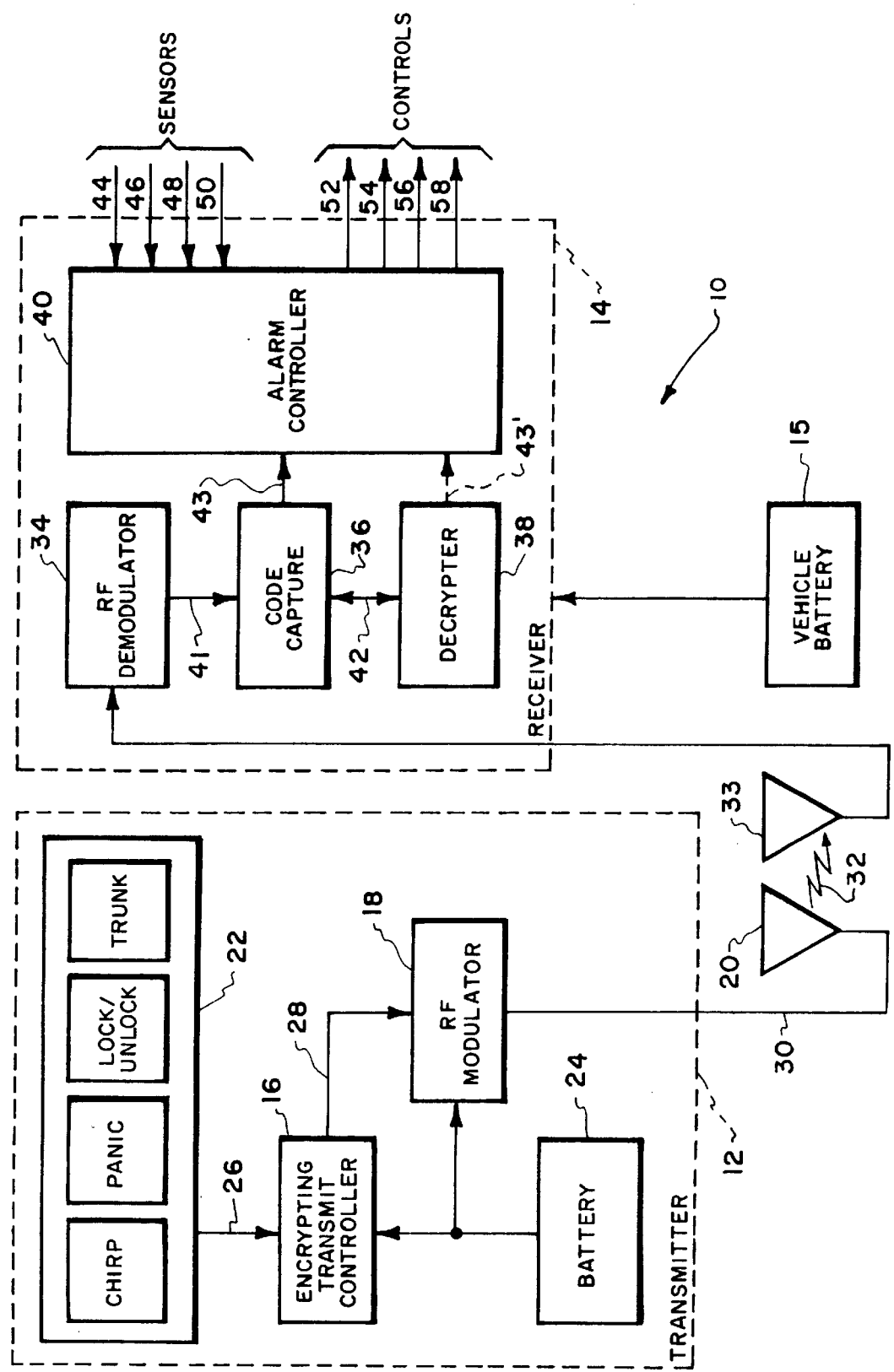
FIG. 1 is a simplified block diagram of a preferred remote keyless entry system which securely passes encrypted messages between a transmitter and a receiver.

FIG. 1 shows a simplified block diagram of a preferred embodiment a remote keyless entry system 10 primarily comprised of an encrypting transmitter 12 (preferably portable) and a decrypting receiver 14 (preferably located within a vehicle and powered by the vehicle battery 15). The transmitter 12 is primarily comprised of an encrypting transmit controller 16, an RF modulator 18, a transmit antenna 20, one or more switch inputs 22, and a power source 24, e.g., a battery, for providing power to the transmit controller 16 and the RF modulator 18. Preferably, the transmit controller 16 is implemented using a microcontroller, preferably a single chip, operating under control of a sequence of software instructions. However, hardware embodiments are also considered to be within the scope of the present invention. In operation of a preferred embodiment, the transmit controller 16 monitors signal path 26 for user activations of the switch inputs 22. Whenever a switch 22 is activated, e.g., depressed, the transmit controller 16 encrypts data messages, preferably fixed length, which are output via signal path 28 to RF modulator 18. In turn, the RF modulator 18 generates an RF modulated signal at a prescribed frequency, e.g., between 300–320 MHz or 405–450 MHz, which it outputs via signal path 30 to transmit antenna 20 for emitting a transmit signal 32 to the decrypting receiver 14.

The decrypting receiver 14 is primarily comprised of an antenna 33, an RF demodulator 34, a code capture apparatus 36, a decrypter 38, and an alarm controller 40. Preferably, the code capture apparatus 36, decrypter 38 and alarm controller 40 are implemented using a single microcontroller, preferably a single chip, operating under control of a sequence of software instructions. However, embodiments which are implemented using multiple microcontrollers, hardware, or a combination thereof are also considered within the scope of the present invention. In operation of a preferred embodiment, the RF demodulator 34 monitors a prescribed frequency range corresponding to the transmit frequency range for transmit signal 32. The RF demodulator 34 provides a demodulated data stream 41 to the code capture apparatus 36. The code capture apparatus 36 captures an encrypted message and makes the captured message available to decrypter 38 via bidirectional data path 42. The decrypter 38 then operates on the captured message to decrypt and authenticate its contents and then preferably returns status and switch code data to the code capture apparatus 36 via bidirectional data path 42. The code capture apparatus 36 then provides decrypted commands via signal path 43 to the alarm controller 40. Alternatively, the decrypter 38 can directly provide decrypted commands (via signal path 43') to the alarm controller 40. The alarm controller 40 operates on the decrypted commands, a plurality of inputs 44–50, e.g., sensor and switch inputs, and control outputs 52–58, e.g., a siren output, door latches, etc., typically to maintain security of a vehicle (not shown).

Figure 2:
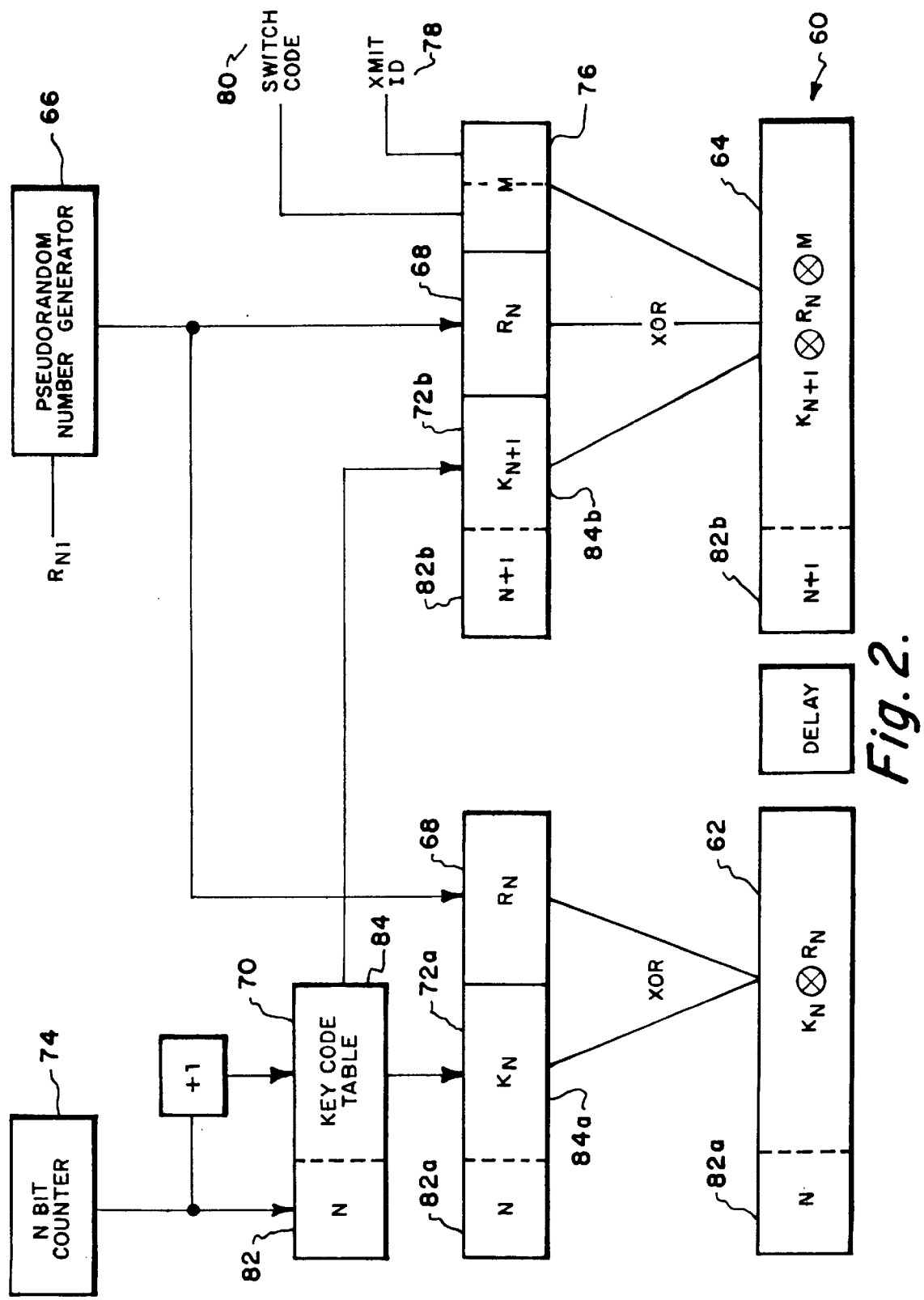
FIG. 2 is a simplified block diagram showing how the encrypted messages generated by the transmit controller are formed.

FIG. 2 shows a simplified block showing how the transmit controller 16 forms a preferred encrypted message 60 preferably comprised of two message portions 62 and 64. The primary elements used to form the encrypted message 60 are a J bit pseudorandom number generator 66 for generating J bit pseudorandom numbers 68 and a key code table 70 for containing a plurality of predefined K bit key code values 72. Operating in combination with a N bit counter 74, used to select key code values 72 from the key code table 70, binary values from the pseudorandom number generator 66 and the key code table 70 are combined with a message data value (M) 76 (defined as a predetermined L bit transmit identification code (xmit ID) 78 concatenated with an I bit switch code value 80 provided by the switches 22).

Figure 3A:
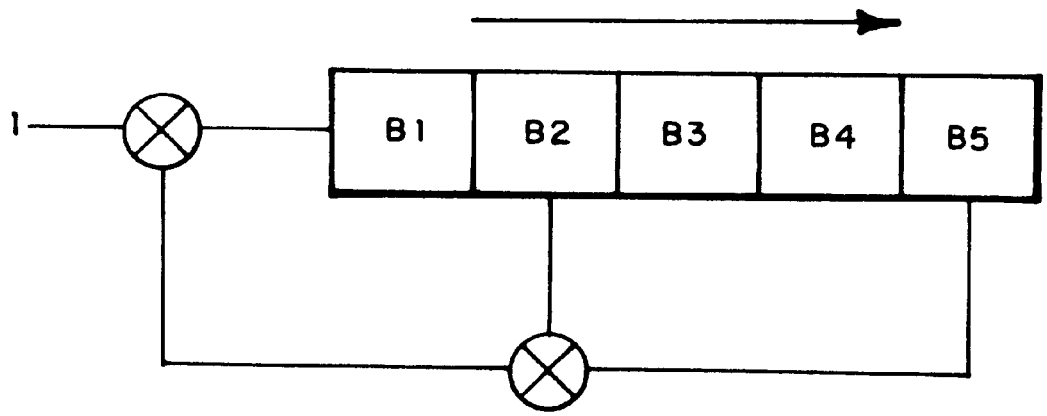
FIG. 3a shows a diagram of an exemplary 5 bit incrementing pseudorandom number (PN) generator.
Figure 3B:
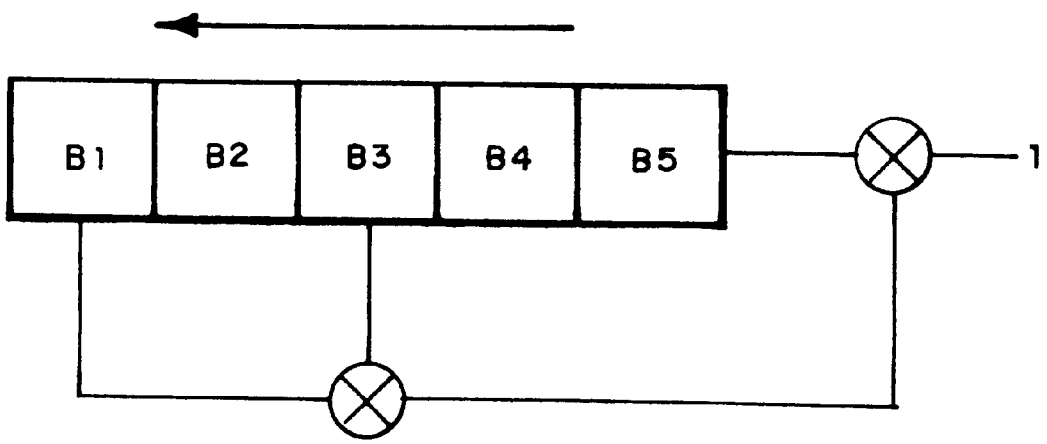
FIG. 3b shows a diagram of an exemplary 5 bit decrementing pseudorandom number (PN) generator.

The pseudorandom number generator 66 is constructed of any apparatus that predictably outputs a seemingly random multibit code. Due to this predictability requirement, such a generated output is referred to as pseudorandom. Additionally, for reasons described further below, the algorithm corresponding to the pseudorandom number generator must be reversible to allow an inverse algorithm to identify a past pseudorandom number value. FIG. 3*a* shows an exemplary 5 bit apparatus, referred to as an incrementing pseudorandom number (PN) generator, which feeds back the bitwise sum (or exclusive OR) of multiple predefined bits (bits 2 and 5) of a shift register plus one into the most significant bit (MSB), i.e., B1, of the shift register as it is shifted right. Similarly, FIG. 3*b* shows an exemplary 5 bit decrementing PN generator which reversibly generates a prior pseudorandom value by feeding back the bitwise sum of multiple predefined bits (bits 1 and 3) of a shift register plus one into the least significant bit (LSB), i.e., B5, of the shift register as it is shifted left. In this example, a sequence of 5 bit codes are generated, as shown in Table I. However, this technique can also be used to generate larger, and thus more random, results. As discussed further below, an exemplary embodiment uses a 20 bit pseudorandom number generator. Table II shows exemplary feedback choices for a 20 bit pseudorandom number generator. While a hardware implementation is shown for both the incrementing and decrementing PN generators, a software implemented solution is also considered to be within the scope of the present invention.

TABLE I

Five(5) bit Pseudorandom Numbers 1 2 3 4 5

0 0 0 0 0
1 0 0 0 0
1 1 0 0 0
0 1 1 0 0
0 0 1 1 0
1 0 0 1 1
0 1 0 0 1
1 0 1 0 0
1 1 0 1 0
0 1 1 0 1
1 0 1 1 0
1 1 0 1 1
1 1 1 0 1
1 1 1 1 0
0 1 1 1 1
1 0 1 1 1
0 1 0 1 1
1 0 1 0 1
0 1 0 1 0
0 0 1 0 1
0 0 0 1 0
1 0 0 0 1
0 1 0 0 0
0 0 1 0 0
1 0 0 1 0
1 1 0 0 1
1 1 1 0 0
0 1 1 1 0
0 0 1 1 1
0 0 0 1 1
0 0 0 0 1

TABLE II

Incrementing/Decrementing 20 Bit Pseudorandom Number Generators

| INCREMENTING | DECREMENTING |
|---|---|
| B1=B20+B1+1 | B20=B2+B1+1 |
| B1=B20+B9+B5+B3+1 | B20=B10+B6+B4+B1+1 |
| B1=B20+B19+B4+B3+1 | B20=B20+B5+B4+B1+1 |
| B1=B20+B11+B8+B6+B3+B2+1 | B20=B12+B9+B7+B4+B1+1 |
| B1=B20+B17+B14+B10+B7+B4+B3+1 | B20=B18+B15+B11+B8+B5+B4+B1+1 |
| B1=B2+1 | B20=B3+B1+1 |

The key code table 70 is formed of a fixed set of seemingly random K bit key codes ($K_N$) 72. Each key code 72 is preferably formed of two binary fields 82 and 84 which combine to bit key code 72. The first field, i.e., the number field, 82 is preferably a number of bits wide sufficient to define an index value having a range equal to the length of the key code table 70. In an exemplary embodiment, the key code table 70 is 16 elements long. Consequently, the number field 82 is 4 bits wide to allow each key code value 72 to distinctly specify one of the 16 possible elements. The remaining, seemingly random, bits define the key field 84 preferably having a width corresponding to the width of the message data value (M) 76. In an exemplary embodiment, the message data value (M) 76 is 20 bits wide and is formed of a 4 bit switch code value 80 and a 16 bit xmit ID 78. Consequently, an exemplary key code value is 20 (4+16) bits wide. An exemplary key code table is shown in Table III.

TABLE III

| Number field | Key field |
|---|---|
| 1 1 1 1 | 1 0 0 0 0 0 0 0 0 0 0 0 0 0 0 0 |
| 0 0 0 0 | 1 0 0 0 0 0 0 0 0 0 0 0 0 0 0 0 |
| 1 1 1 0 | 0 1 0 0 0 0 0 0 0 0 0 0 0 1 0 0 0 |
| 0 0 0 1 | 0 1 0 0 0 0 0 0 0 0 0 0 0 1 0 0 0 |
| 1 1 0 1 | 0 0 1 0 0 0 0 0 0 0 0 0 0 1 0 0 0 0 |
| 0 0 1 0 | 0 0 1 0 0 0 0 0 0 0 0 0 1 0 0 0 0 0 |
| 1 1 0 0 | 0 0 0 1 0 0 0 0 0 0 0 0 0 1 0 0 0 0 0 |
| 0 0 1 1 | 0 0 0 1 0 0 0 0 0 0 0 0 0 1 0 0 0 0 0 |
| 1 0 1 1 | 0 0 0 0 1 0 0 0 0 0 0 0 1 0 0 0 0 0 0 |
| 0 1 0 0 | 0 0 0 0 1 0 0 0 0 0 0 0 1 0 0 0 0 0 0 |
| 1 0 1 0 | 0 0 0 0 0 1 0 0 0 0 0 1 0 0 0 0 0 0 0 |
| 1 0 0 1 | 0 0 0 0 0 0 1 0 0 0 1 0 0 0 0 0 0 0 0 |
| 0 1 0 1 | 0 0 0 0 0 0 1 0 0 0 1 0 0 0 0 0 0 0 0 |
| 1 0 0 0 | 0 0 0 0 0 0 0 1 0 1 0 0 0 0 0 0 0 0 0 |
| 0 1 1 0 | 0 0 0 0 0 0 0 1 0 1 0 0 0 0 0 0 0 0 0 |
| 0 1 1 1 | 0 0 0 0 0 0 0 0 1 0 0 0 0 0 0 0 0 0 0 |

While number field 82 is shown in a specific location, e.g., the 4 MSBs of the key code 72, the number field 82 can alternatively be interspersed within the other key code bits. Accordingly, the corresponding number fields can also be interspersed within the message portions 62 and 64.

As shown in FIG. 2, the first message portion 62 is formed by performing an exclusive OR (also referred to a an XOR or symbolically shown as "⊕") between the pseudorandom number value $R_N$ 68 and a first key code value $K_N$ 72a from the key code table 70 selected by the value of the counter 74. Consequently, the $R_N$ 68 and $K_N$ 72a values are encrypted to not be discernable to an unauthorized receiver. However, as will be further illustrated below, the number field 82a is left unencrypted. The significance of an XOR (or any other bitwise operation, e.g., a modulo 2 add) is that it is reversible to permit retrieval of an encrypted operand. The second message portion 64 is formed by performing an exclusive OR between the same pseudorandom number value $R_N$ 68, a next key code value $K_{N+1}$ 72b (formed by selecting the next sequential entry from the key code table 70), and M 76 (formed by concatenating the switch code value 80 with the xmit ID 78). Consequently, the $R_N$ 68, $K_{N+1}$ 72b and M 76 values are encrypted to not be discernable to an unauthorized receiver. However, the number field 82b is left unencrypted. While $R_N$ 68 preferably does not change between first and second message portions 62 and 64, the pseudorandom number generator 66 does periodically operate between messages upon a prior pseudorandom number $R_{N-1}$ to form a new pseudorandom number $R_N$. In an exemplary embodiment, a new pseudorandom number 68 is generated every 16 message portions or every 8 full transmissions (since transmissions are preferably formed of a pair of message portions 62 and 64). Additionally, a new pseudorandom number $R_N$ is preferably generated each time the switch code changes, e.g., each time a switch is depressed or released.

Exemplary field definitions and widths are shown in Table IV where the key code values 72 are 24 bits wide and contained in a 16 element table having a 4 bit number field and 16 bit key field and the pseudorandom number values 68 are 20 bits wide. Consequently each of the message portions 62 and 64 are 24 bits wide.

TABLE IV

| $K_N$ | | |
|---|---|---|
| ¦B23 ... | (24 bits total) | ... B2¦B1¦B0 ¦ |
| $R_N$ | | |
| ¦B19 ... | (20 bits total) | ... B0 ¦ |
| M | | |
| ¦B19-B16¦ | B15-(16 bits total)-B0 ¦ |
| ¦Switch ¦ | ID ¦ |
| ¦Code ¦ | ¦ |
| Message portions | | |
| ¦B23 ... | (24 bits total) | B2¦B1¦B0 ¦ |

The following example describes the forming of message portions 62 and 64 for the exemplary values of Table III and the following initial values:

counter value(N) = 1000

$R_N$ = 10011010111100000101 xmit ID = 1100110010101010 switch code = 0001

The first message portion 62 is calculated as follows:

| | | |
|---|---|---|
| KN= | 10110000100000010000000 | See the 1000 value of the key code table shown in Table III. |
| // | | |
| RN= | 10011010111100000101 | For this example, the pseudorandom number generator is not updated. |
| $K_N \otimes R_N$= | 10111001001011110000101 | Note that the number field, the 4 MSBs of the result, corresponds to the 4 MSBs of $K_N$. |

The second message portion 64 is calculated as follows:

| | | |
|---|---|---|
| $K_{N+1}$= | 01000000100000010000000 | See the 1001 value of the key code table shown in Table III. |
| $R_N$= | 10011010111100000101 | The pseudorandom number generator is not updated between message portions. |
| M= | 00011100110010101010 | Formed by concatenating the switch code value with the xmit ID. |
| $K_{N+1} \otimes R_N \otimes M$= | 01001000111000110010111 | Note that the number field, the 4 MSBs of the result, corresponds to the 4 MSBs of $K_{N+1}$. |

The receiver 14 must perform an inverse operation, described further below, to retrieve and authenticate the received data. The receiver 14 must have an equivalent pseudorandom number generator that is synchronized with the pseudorandom number generator 66 in the transmitter 12 and a stored receive/reference ID corresponding to the xmit ID 78. Additionally, the receiver 14 must have key code table essentially equivalent to the key code table 70 in the transmitter 12. Preferably, the receiver 14 will have its key code table with key code values ordered according to their number field. As such, the number field can be eliminated. An exemplary ordered key code table corresponding to Table III is shown in Table V.

TABLE V

| Number field | Key field |
|---|---|
| 0 0 0 0 | 1 0 0 0 0 0 0 0 0 0 0 0 0 0 0 0 |
| 0 0 0 1 | 0 1 0 0 0 0 0 0 0 0 0 0 0 1 0 0 0 |
| 0 0 1 0 | 0 0 1 0 0 0 0 0 0 0 0 0 0 1 0 0 0 0 |
| 0 0 1 1 | 0 0 0 1 0 0 0 0 0 0 0 0 1 0 0 0 0 0 |
| 0 1 0 0 | 0 0 0 0 1 0 0 0 0 0 0 1 0 0 0 0 0 0 |
| 0 1 0 1 | 0 0 0 0 0 1 0 0 0 1 0 0 0 0 0 0 0 |
| 0 1 1 0 | 0 0 0 0 0 0 1 0 1 0 0 0 0 0 0 0 0 |
| 0 1 1 1 | 0 0 0 0 0 0 0 1 0 0 0 0 0 0 0 0 0 |
| 1 0 0 0 | 0 0 0 0 0 0 0 1 0 1 0 0 0 0 0 0 0 |
| 1 0 0 1 | 0 0 0 0 0 0 1 0 0 0 1 0 0 0 0 0 0 |
| 1 0 1 0 | 0 0 0 0 0 1 0 0 0 0 0 1 0 0 0 0 0 |
| 1 0 1 1 | 0 0 0 0 1 0 0 0 0 0 0 0 1 0 0 0 0 |
| 1 1 0 0 | 0 0 0 1 0 0 0 0 0 0 0 0 0 1 0 0 0 0 |
| 1 1 0 1 | 0 0 1 0 0 0 0 0 0 0 0 0 0 1 0 0 |
| 1 1 1 0 | 0 1 0 0 0 0 0 0 0 0 0 0 0 0 1 0 |
| 1 1 1 1 | 1 0 0 0 0 0 0 0 0 0 0 0 0 0 0 0 |

An exemplary decryption/authentication sequence is shown for the previously calculated values:

```
    R_N       = 10011010111100000101
    receive ID= 1100110010101010
//
first message portion
    K_N ⊗ R_N = 10111001001011110000101
second message portion
    K_{N+1} ⊗ R_N ⊗ M = 01001000111000110010111
            N = 1011                    Extracted from
                                        the 4 MSBs of the
                                        first message
                                        portion.
            K_N = 10110000100000010000000  Selected from
                                        Table V according
                                        to the extracted
                                        N.
Thus:
            RN = 00001001101011110000101   Calculated by
                                        $K_N \otimes (K_N \otimes R_N) = R_N$.
            N+1 = 0100                   Extracted from
                                        the 4 MSBs of the
                                        second message
                                        portion.
            K_{N+1} = 01000000100000010000000  Selected from
                                        Table V according
                                        to extracted N+1.
    (K_{N+1} ⊗ R_N) = 01001001001011110000101   Calculated from
                                        the $K_{N+1}$ selected
                                        according to the
                                        N+1 of the second
                                        message portion
                                        and the $R_N$
                                        calculated from
                                        the first message
                                        portion.
            M = 00000001110011001010101010  Calculated by
                                        $(K_{N+1} \otimes R_N \otimes M)$
                                        $\otimes$
                                        $(K_{N+1} \otimes R_N)$ = M.
and thus:
    switch code = 0001
    xmit ID = 1100110010101010
```

It should be noted that the recovered xmit ID equals the receive ID and the recovered $R_N$ equals the $R_N$ from the receiver's pseudorandom number generator. Thus, the data is authenticated and the receiver will operate on the authenticated switch code data. However, it should also be noted that in this exemplary embodiment, the switch code, xmit ID, and RN can be recovered from any transmitter even if the transmitter is not authorized for a particular receiver. This feature is of significance in regards to LEARN and RELEARN modes discussed below.

Figure 4:
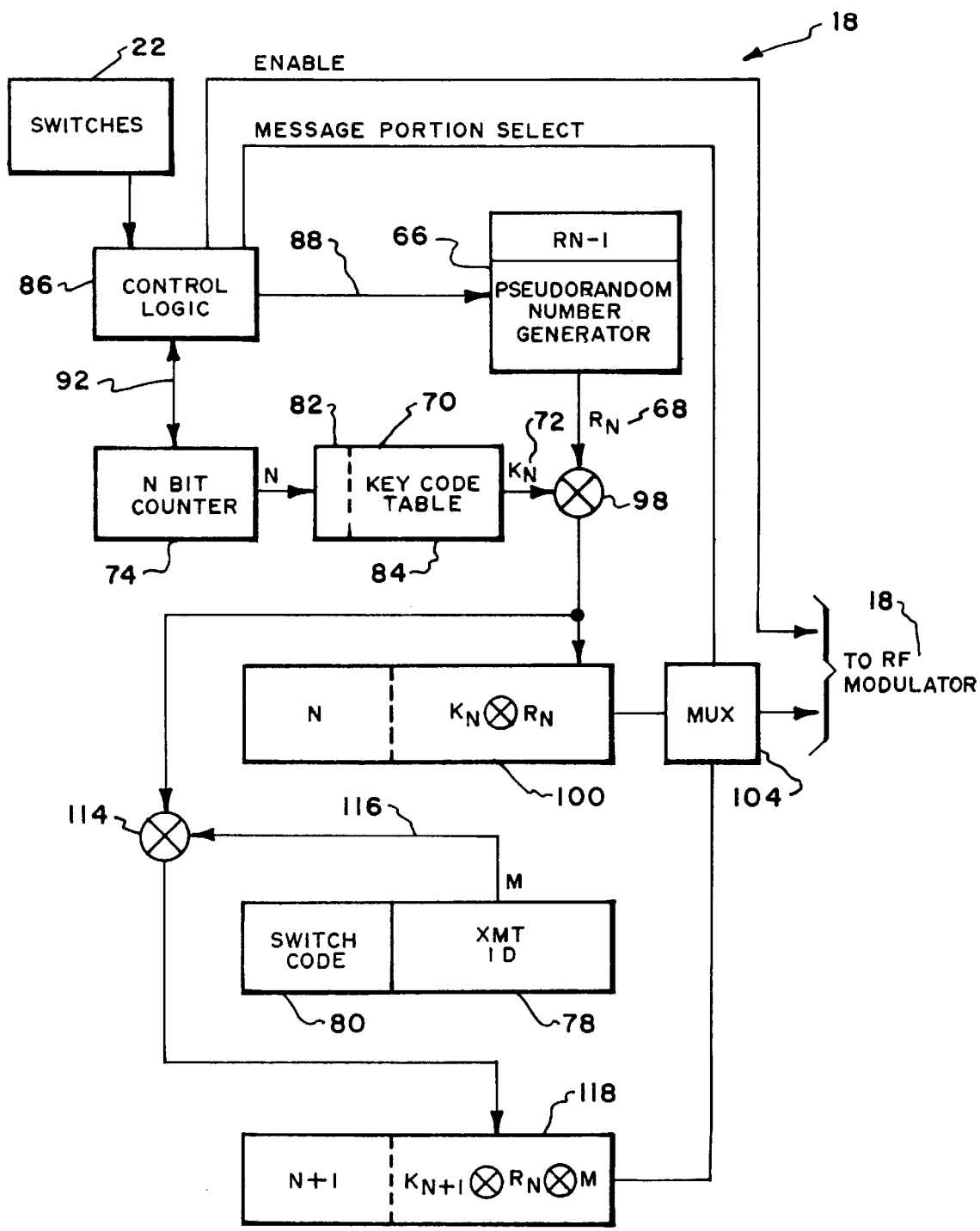
FIG. 4 is an exemplary block diagram of a preferred transmit controller for generating the securely encrypted message of the present invention.
Figure 5:
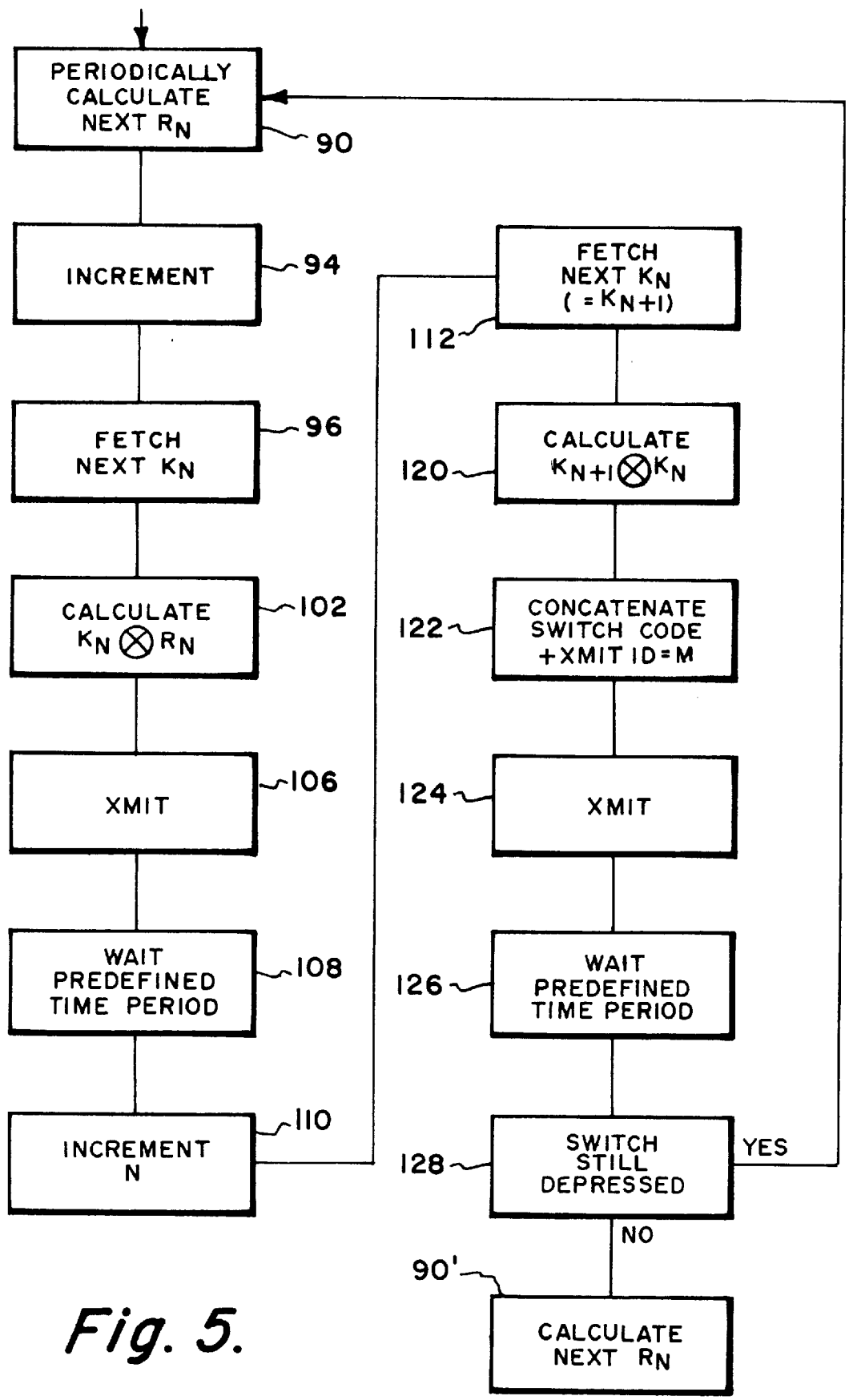
FIG. 5 is an exemplary functional flow chart for generating the securely encrypted message of the present invention.

FIG. 4 shows a block diagram of an exemplary hardware implementation of the transmit controller 16 which can be understood best by examining the functioning of its blocks in conjunction with FIG. 5 an exemplary functional flow chart, best implemented in software. Switches 22 are continually monitored for depression by control logic 86. When one or more switch depressions are detected (and preferably debounced by the control logic 86), the control logic 86 generates a signal 88 to commence generating the encrypted message 60 by calculating the next $R_N$ (see block 90). In a preferred embodiment, this operation occurs every 16 iterations of the counter 74 or every 8 messages. However, other repetition rates are also considered within the scope of the present invention. For example, each time a switch is released a new $R_N$ can be generated (see block 90'). Next, the counter 74 is incremented using signal 92 and counter 74 is used as an index into the key code table 70 to fetch the next $K_N$ (see blocks 94 and 96). The value $K_N \otimes R_N$ is then calculated using eXclusive OR 98 and stored in first message portion register 100 (see block 102). The contents of register 100 are then serially passed through multiplexer 104 under control of control logic 86 to the RF modulator 18. The RF modulator 18 (preferably powered for the duration of the transmission under control of the control logic 86) proceeds by serially transmitting the first message portion 62 at a predefined bit rate, e.g., 300 BPS (see block 106). Preferably, the transmit controller 16 delays a predefined time period, e.g., 6–10 clock periods, before transmitting the second message portion 64 (see block 108). Optionally, the receiver 14 may measure this delay and use this measurement as an additional factor for authenticating the received message. The control logic 86 then increments the counter 74 and fetches the next $K_{N+1}$ from the key code table 70 (see blocks 110 and 112). An intermediate value $K_{N+1} \otimes R_N$ is then calculated using eXclusive OR 98 and this intermediate value is exclusive ORed with M 116, the message value, using XOR 114. This result is then stored in a second message portion register 118 (see blocks 120 and 122). The contents of register 118 are then serially passed through multiplexer 104 under control of control logic 86 to the RF modulator 18. The RF modulator 18 then proceeds by serially transmitting the second message portion 64 (see block 124). Preferably, the transmit controller 16 then delays a predefined time period, e.g., 6–10 clocks, after which transmission begins on a next encrypted message 60 (see blocks 126 and 128).

Figure 6:
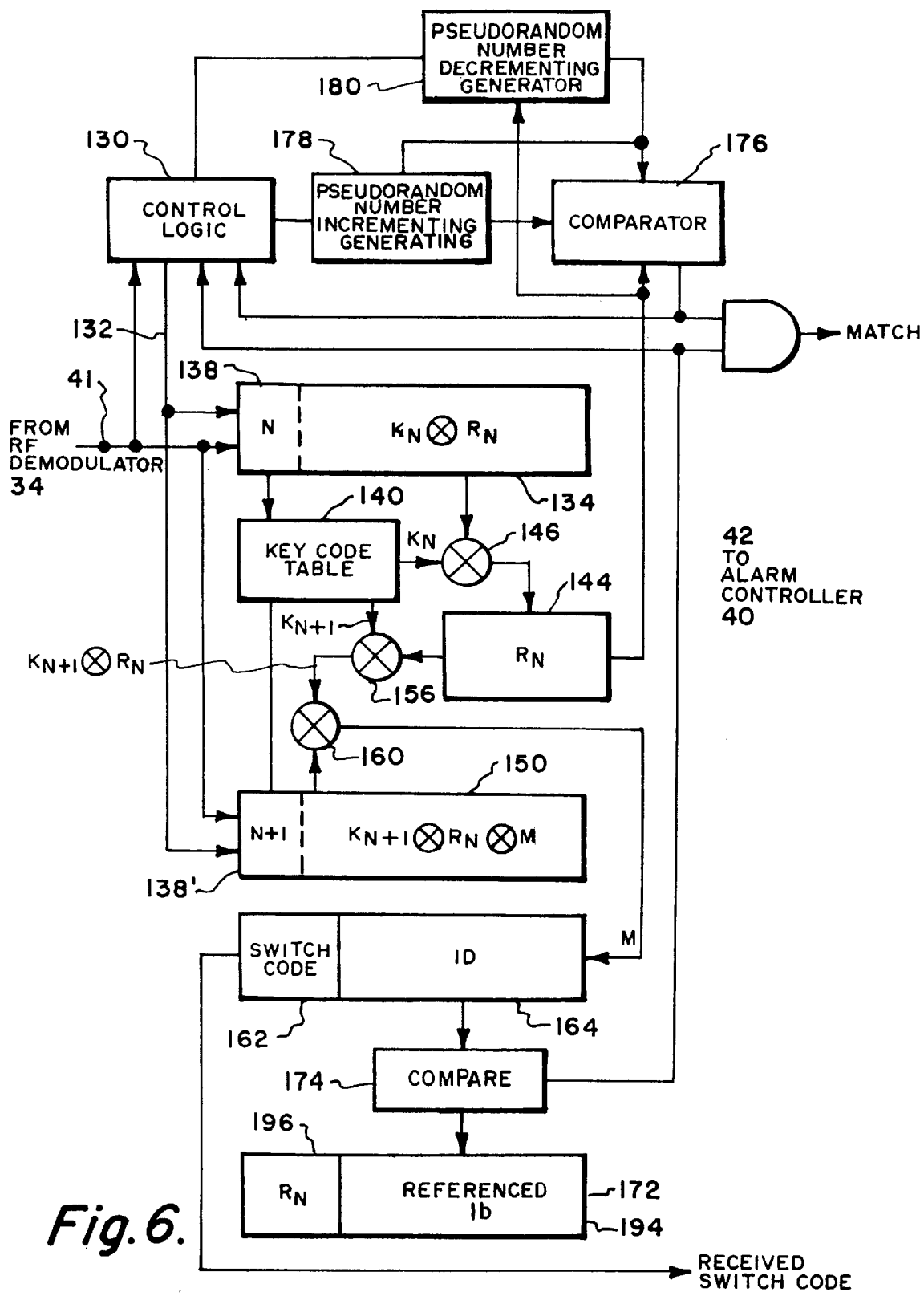
FIG. 6 is an exemplary block diagram of a preferred receiver portion for decrypting and authenticating the encrypted message of the present invention.
Figure 7:
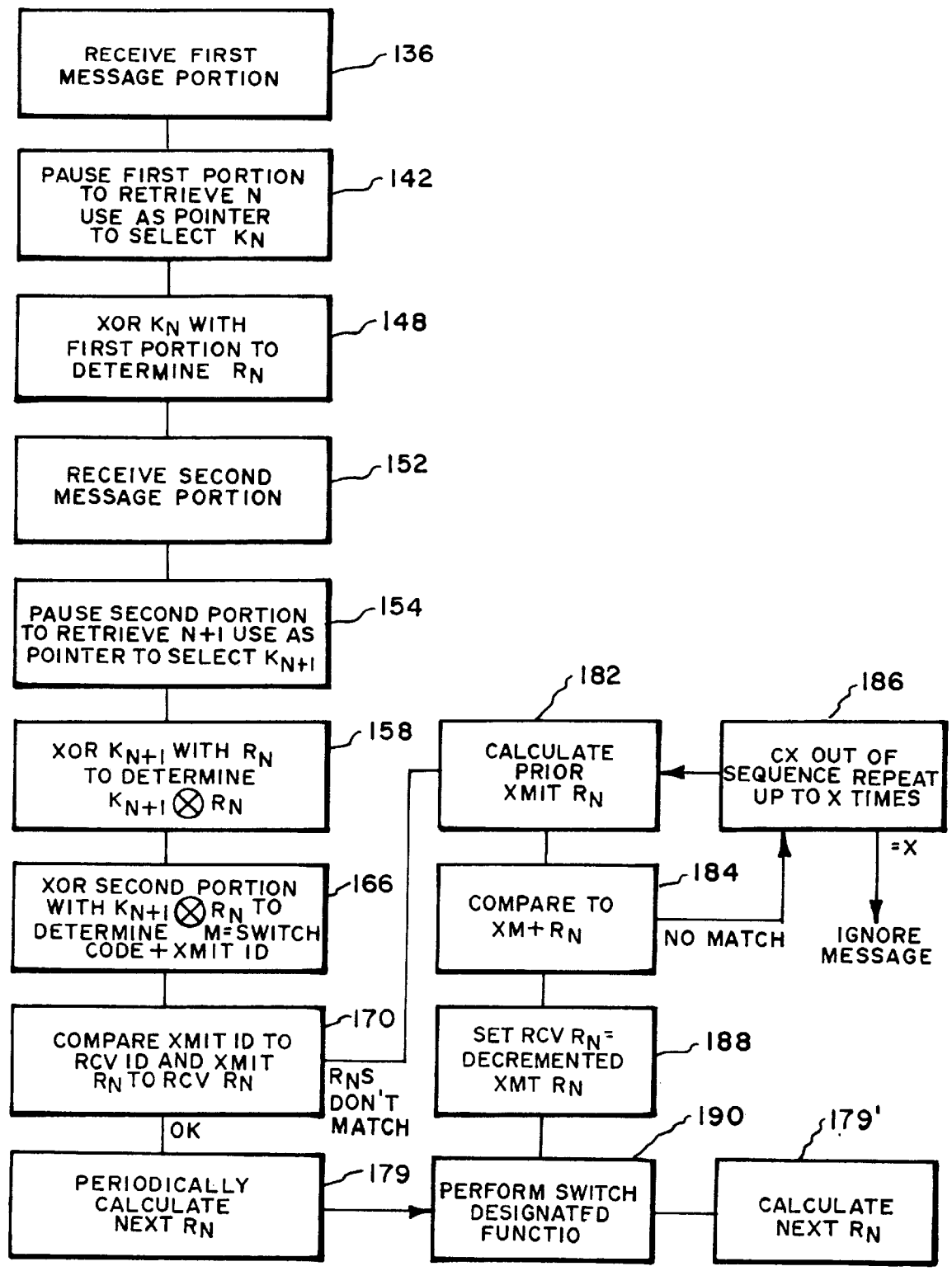
FIG. 7 is an exemplary functional flow chart for decrypting and authenticating the encrypted message of the present invention.

FIG. 6 shows a block diagram of an exemplary hardware implementation of the receiver 14 which can be understood best by examining the functioning of its blocks in conjunction with FIG. 7 an exemplary functional flow chart, best implemented in software. The RF demodulator 34 continuously monitors for RF signals. Demodulated data 41 is retimed by control logic 130 and clocked using signal 132 into first serial receive register 134 (see block 136). The number field 138, e.g., the 4 MSBs of the register 134, is used as an index into a receive key code table 140 to extract $K_N$ (see block 142). As previously described, the receive key code table 140 has essentially the same contents as the transmit key code table 72. However, the contents of the receive key code table 140 are preferably sequentially ordered according to the number field 138 data to simplify fetching the key code values. Optionally, the bit width of the receive key code table 140 may be minimized by eliminating its number field. The transmitted $R_N$ is then extracted and saved in $R_N$ register 144 by first exclusive ORing (using XOR 146) the fetched $K_N$ with the first receive register 134 (see block 148).

The second message portion 64 is similarly received and stored in a second serial receive register 150 (see block 152). Similarly, the number field 138' is used to fetch a next key code value $K_{N+1}$ (see block 154). An intermediate value $K_{N+1} \otimes R_N$ is obtained by XORing (using XOR 156) the fetched $K_{N+1}$ with the saved $R_N$ register 144 (see block 158). This intermediate value is then XORed (using XOR 160) with the second serial receive register 150 to retrieve an unencrypted M which is comprised of a received switch code 162 and ID 164 (see block 166).

Due to the reciprocal nature of an XOR operation, the calculation order can be reordered and still obtain the identical result. For example, if the second serial receive register 150 is XORed with the fetched $K_{N+1}$ value an intermediate value of $R_N \otimes M$ would result. If this intermediate value was then XORed with the saved $R_N$ register 144, the identical unencrypted M value would again be retrieved.

Before passing the received switch code 162 to the alarm controller 40, the received message must be authenticated. As a first authentication step (see block 170), the received ID 164 is compared to a value from a receive reference ID storage 172 using comparator 174. (The origin of the contents of the receive reference ID storage 172 is discussed further below.) Next, comparator 176 compares the received $R_N$ 144 to the current value in a receive pseudorandom number generator 178, preferably an incrementing PN generator. (Note that after receiving a predetermined number of messages 60, the control logic 130 causes the receive pseudorandom number generator 178 to form the next pseudorandom number $R_N$ (see block 179). Additionally, the receive pseudorandom number generator 178 is preferably incremented at the end of each sequence of transmissions (see block 179').) As an additional authentication check, the receiver may confirm that the received number field has incremented for each message portion. Additionally, since the number fields have an odd/even relationship (i.e., (N+1)/N) between message portions, this relationship can also be used as an authentication check. If the designated authentication steps succeed, the switch code 162 is sent to the alarm controller 40 for further processing.

However, the pseudorandom numbers may not always match. For example, a transmitter 12 may have been activated outside of the RF reception range of the receiver 14. Consequently, the transmitter pseudorandom number generator 66 may have a more advanced value than the value in the receiver pseudorandom number generator 178. Therefore, a preferred receiver 14 is responsive to a transmitter 12 that has iterated its pseudorandom number generator 66 out of synchronization with the pseudorandom number generator 178 in the receiver 14. In an exemplary embodiment, an error range of up to 100 iterations is accepted. To accomplish this task, a preferred receiver 14 additionally has a decrementing pseudorandom number generator 180 or equivalent that can generate prior pseudorandom numbers. Initially, the decrementing generator 180 is set to the received $R_N$ from the stored $R_N$ register 144. The control logic 130 then causes the decrementing generator 180 to generate a prior $R_N$ value which is compared using comparator 176 to the value in the pseudorandom number generator 178. This operation repeats as required up to a predetermined number, e.g., 100, of times. If the pseudorandom numbers match within this range of iterations, the pseudorandom number generator 178 is set to the matched value and the switch code 162 is passed to the alarm controller 40 (see blocks 182–190).

In a preferred embodiment, a receiver 14 is capable of responding to multiple, e.g., 4, transmitters 12. To accomplish this, the receive reference ID storage 172 contains IDs 194 from multiple, e.g., 4, transmitters, as well as current $R_N$ values 196 corresponding to each of the stored IDs 194. When receiving a message, the receiver 14 first searches the stored IDs 194 in the receive ID storage 172 to determine the corresponding expected $R_N$ 196 and then loads the corresponding $R_N$ 196 into the pseudorandom number generator 178. At the completion of processing message 60, the expected $R_N$ 196 is updated.

Preferably, the transmit IDs 78 are predetermined at the factory by programming the ID code into a nonvolatile storage device, e.g., an EPROM, EEPROM, PROM or NVRAM. Alternatively, the ID code can be set according to DIP switches, by cutting etch on a printed circuit card, or inserting jumpers. The receive reference IDs 194 can be similarly set. However, it is preferable that the receiver 14 can learn the receive reference IDs 194. To cause the receiver 14 to learn a receive reference ID 194, the receiver 14 must enter into a LEARN mode. Various means can be used to so instruct the receiver 14. An exemplary means would be removing power from the receiver 14 (an unusual act), activating one or more predefined switch inputs 44–50, e.g., opening the trunk, and then restoring power. Alternative means would include a dedicated switch input that is generally inaccessible to a user (or intruder) or any other sequence of switch inputs 44–50 that would not occur during normal use. i.e., a sequence that is unlikely for a user to accidentally or mistakenly perform. Once a LEARN mode is entered, the receiver 14 accepts any ID and associated $R_N$ as the current valid values for the particular transmitter 12 and stores the received values in the receive reference ID storage 172. This is possible in a preferred embodiment since any receiver 14 can retrieve the current $R_N$ and ID for any transmitter 12. However, it should be noted that a receiver 14 will not respond to unauthorized transmitters since the $R_N$ and ID comparisons will fail. Optionally, the receiver 14 can require receptions of continuous transmissions for a predetermined period of time, e.g., more than 4 seconds.

Thus, the LEARN mode allows any transmitter 12 to access the receiver 14 since it causes the receiver 14 to learn the ID and associated $R_N$ value. However, on certain occasions, e.g., if the battery 24 is depleted in the transmitter 12, the xmit ID 78 is already known to the receiver 14 but the transmitted $R_N$ value will most likely be out of range by more than the predetermined limit. In such a case, a preferred embodiment allows entry into a RELEARN mode. In a RELEARN mode, the receiver 14 will relearn the $R_N$ value for a transmitter 12 whenever the received ID 164 matches a stored ID 194 and it receives continuous transmissions for a predetermined period of time, e.g., more than 6 seconds.

Although the present invention has been described in detail with reference only to the presently-preferred embodiments, those of ordinary skill in the art will appreciate that various modifications can be made without departing from the invention. For example, the exemplary receiver described above responds to a single message, i.e., a pair of message portions. Alternatively, since a preferred transmitter transmits continuously while a switch is depressed, a preferred receiver can require authenticated receptions of sequential messages to further improve security. As a further modification, the two message portions can be combined into a single message or the sequence of message portions can be modified to predominantly comprise the second message portion (which contains the switch code and ID) and only periodically include the first message portion. Additionally, while an exemplary embodiment has been disclosed using 24 bit message portions comprised of a 24 bit $R_N$, a 16 bit ID and a 4 bit switch code, many other combinations are also considered within the scope of the present invention, e.g., 32 bit message portions comprised of a 32 bit $R_N$, a 22 bit ID and a 6 bit switch code. Furthermore, while the number field has been shown in an exemplary embodiment as the 4 MSBs of each message portion, other bit positions are also considered within the scope of the present invention, e.g., positioning these bits as the LSBs or interspersing them within the message portions.

We claim:

1. A system for securely transmitting an I bit switch code from a transmit site to a receive site, comprising:
   a transmit pseudorandom number generator at said transmit site for periodically generating a J bit transmit pseudorandom number;
   a transmit key code table at said transmit site for containing a fixed number of K bit transmit key code values;
   a message encrypter at said transmit site for encrypting a message by performing a bitwise operation between said J bit transmit pseudorandom number, said K bit transmit key code value selected from said transmit key code table, an L bit transmit ID and said switch code;
   an RF modulator at said transmit site for transmitting said message from said transmit site to said receive site;
   an RF demodulator at said receive site for receiving said transmitted message;
   a receive pseudorandom number generator at said receive site for iteratively generating a receive pseudorandom number;
   a receive key code table at said receive site for containing a fixed number of K bit receive key code values;
   a code capture/decrypter at said receive site for capturing, decrypting and authenticating said message according to said J bit receive pseudorandom number, said K bit receive key code value selected from said receive key code table according to said message and an L bit receive ID; and wherein
   said code capture/decrypter recovers said switch code from said message when said message is authenticated.

2. The system of claim 1 wherein said code capture/decrypter includes means to resynchronize said receive pseudorandom number generator to said transmit pseudorandom number generator when said receive pseudorandom number is within a predetermined number of iterations of said transmit pseudorandom number.

3. The system of claim 1 additionally comprising an N bit counter for containing an N bit counter value and wherein said counter value is used to select said transmit key code value from said transmit key code table.

4. The system of claim 1 additionally comprising means to set said receive ID to said transmit ID.

5. The system of claim 1 wherein said code capture decrypter includes means to synchronize said receive pseudorandom number generator to said transmit pseudorandom number generator in response to continuous transmissions of said message for a predetermined period of time.

6. Apparatus for securely transmitting an I bit switch code from a transmit site to a receive site, comprising:
   a transmitter for transmitting a message comprising first and second message portions, said transmitter comprising
      a transmit pseudorandom number generator for forming a J bit transmit pseudorandom number;
      a K bit counter for containing a K bit counter value;
      a transmit key code table having a fixed number of predetermined L bit transmit key code values;
      means for storing an M bit transmit ID;
      first transmitter means for encrypting said first transmit message portion by performing a bitwise operation between a first transmit key code value, selected from said key code table according to a first counter value from said counter, and a first transmit pseudorandom number;
      second transmitter means for encrypting said second transmit message portion by performing a bitwise operation between said second transmit key code value, selected from said key code table according to a second counter value from said counter, a second transmit pseudorandom number, and said switch code; and
      means for transmitting said first and second transmit message portions from said transmit site to said receive site;
   and a receiver comprising
      means for recovering said transmitted first and second transmit message portions;

a receive pseudorandom number generator for iteratively forming a J bit receive pseudorandom number;

a receive key code table having a fixed number of predetermined L bit receive key code values corresponding to said transmit key code values;

means for storing an M bit receive ID;

means for authenticating said first and second message portions according to said receive pseudorandom number, receive key code values and said receive ID; and means for retrieving said switch code from said recovered first and second message portions.

7. The apparatus of claim 6 wherein each of said first and second transmitter means increments said counter prior to respectively generating said first and second transmit message portions.

8. The apparatus of claim 6 wherein said first transmit pseudorandom number equals said second transmit pseudorandom number and said transmit means for forming a J bit pseudorandom number periodically generates a new first and second pseudorandom number as a function of a prior first and second pseudorandom number.

9. The system of claim 6 wherein said authenticating means includes means to resynchronize said receive pseudorandom number generator to said transmit pseudorandom number generator when said receive pseudorandom number is within a predetermined number of iterations of said transmit pseudorandom number.

10. The system of claim 6 additionally comprising means to set said receive ID to said transmit ID.

11. The system of claim 6 wherein said authenticating means includes means to synchronize said receive pseudorandom number generator to said transmit pseudorandom number generator in response to continuous transmissions of said message for a predetermined period of time.

12. A transmitter for securely transmitting a message comprising first and second message portions from a transmit site to a receive site, said transmitter comprising:

a transmit pseudorandom number generator for forming a J bit transmit pseudorandom number;

a K bit counter for containing a K bit counter value;

a transmit key code table having a fixed number of predetermined L bit transmit key code values;

means for storing an M bit transmit ID;

at least one switch for generating an I bit switch value;

first transmitter means for encrypting said first transmit message portion by performing a bitwise operation between a first transmit key code value, selected from said key code table according to a first counter value from said counter, and a first transmit pseudorandom number;

second transmitter means for encrypting said second transmit message portion by performing a bitwise operation between said second transmit key code value, selected from said key code table according to a second counter value from said counter, a second transmit pseudorandom number, and said switch value; and means for transmitting said first and second transmit message portions from said transmit site to said receive site.

13. The apparatus of claim 12 wherein each of said first and second transmitter means increments said counter prior to respectively generating said first and second transmit message portions.

14. The apparatus of claim 12 wherein said first transmit pseudorandom number equals said second transmit pseudorandom number and said transmit means for forming a J bit pseudorandom number periodically generates a new first and second pseudorandom number as a function of a prior first and second pseudorandom number.

15. A method for securely transmitting data from a transmitter to a receiver, comprising the steps of:

periodically calculating a next pseudorandom number algorithmically related to a prior pseudorandom number;

incrementing a key code counter;

using a value contained in said key code counter to retrieve a first key code value from a key code table;

performing a bitwise operation between said first key code value and said next pseudorandom number to obtain a first transmission portion;

transmitting said first transmission portion;

delaying a time period;

incrementing said key code counter;

using said value contained in said key code counter to retrieve a second key code value from said key code table;

performing a bitwise operation between said second key code value and said next pseudorandom number to obtain a bitwise operation result;

retrieving a switch value corresponding to the status of one or more switches;

concatenating said switch value with a transmitter ID to form a message value;

performing a bitwise operation between said message value and said bitwise operation result to obtain a second transmission portion; and transmitting said second transmission portion.

16. A method for securely transmitting data from a transmitter to a receiver, comprising the steps of:

encrypting a first message portion by performing a bitwise operation between a pseudorandom number and a first selected value from a predefined set of key code values;

encrypting a second message portion by performing a bitwise operation between said pseudorandom number, a next one of said predefined set of key code values, a transmitter ID and a second selected value from said predefined set of key code values; and transmitting said first and second messages from said transmitter to said receiver.

17. The method of claim 16 wherein:

said first message portion is formed by eXclusive ORing said pseudorandom number and said first selected key code value; and said second message portion is formed by eXclusive ORing said pseudorandom number, said second selected key code value, and a value formed by concatenating said transmitter ID and a said selected switch code value.

* * * * *